Aug. 4, 1925.

J. F. HERBERT, JR 1,548,780

REFLECTIONLESS OPHTHALMO ILLUMINATOR

Filed Aug. 28, 1924   2 Sheets-Sheet 1

J. Frederick Herbert, Jr.
INVENTOR

BY Victor J. Evans
ATTORNEY

WITNESS:

Aug. 4, 1925.

J. F. HERBERT, JR 1,548,780

REFLECTIONLESS OPHTHALMO ILLUMINATOR

Filed Aug. 28, 1924

J. Frederick Herbert. Jr.
INVENTOR

Patented Aug. 4, 1925.

1,548,780

UNITED STATES PATENT OFFICE.

JOHN FREDERICK HERBERT, JR., OF PHILADELPHIA, PENNSYLVANIA.

REFLECTIONLESS OPHTHALMO ILLUMINATOR.

Application filed August 28, 1924. Serial No. 734,761.

*To all whom it may concern:*

Be it known that I, JOHN FREDERICK HERBERT, Jr., a citizen of the United States, residing at Philadelphia, in the county of Philadelphia and State of Pennsylvania, have invented new and useful Improvements in Reflectionless Ophthalmo Illuminators, of which the following is a specification.

This invention relates to optical devices, and an object of the invention is to provide an ophthalmo illuminator for internal and external illumination, examination and photography of the eye, which device is constructed to prevent disturbing or undesirable reflection of the light rays.

Another object of this invention is to provide an optical device as specified, which utilizes novel constructions of eye contacting lenses, objective lenses, reflecting prisms, illuminating means, opaque screens, light diffusing diaphragms, color filters and light reflectors in combinations to efficiently illuminate the interior of the eye without causing disturbing reflections, and in such manner as to permit acute undistorted photographic reproductions of the eye or other objects.

Another object of the invention is to provide a reflectionless ophthalmo illuminator which is adapted for close contact to the eye without injurious or discomforting effects which may be conveniently applied, and adjusted, and which will permit uniformly diffused relatively large field of illumination of the eye.

Other objects of the invention are to provide a device as specified, which is designed so as to prevent the moistening of the external surface of contact of the lens and the wetting and soiling of the objective lens, permitting the device to be applied to the eye and then properly treated to prevent misting or the collecting of condensation upon any portion of the lens; to provide a device which may be easily and conveniently cleansed and sterilized; one which includes an opaque casing for the lighting means for preventing improper projection of the light rays and also which is designed to permit the use of light screens, light diffusing diaphragms, color filters or analogous devices therewith.

The present invention embodies improvements over the analogous devices disclosed in my application for Letters Patent upon an "oculo-microscopic and photographic apparatus," filed July 20th, 1923, Serial No. 652,844.

Other objects of the invention will appear in the following detail description, and in the accompanying drawings wherein.

Figure 7:
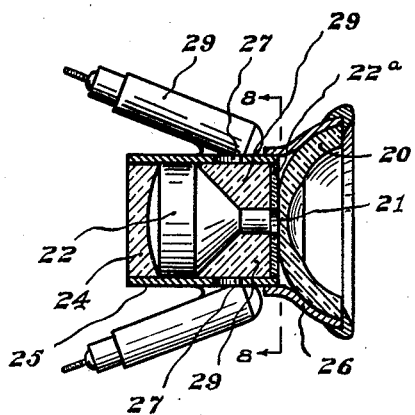
Figure 7 is a longitudinal section through a second modified form of the invention.

Fig. 7ª is a front elevation of the eye contact lens.

Figure 8:
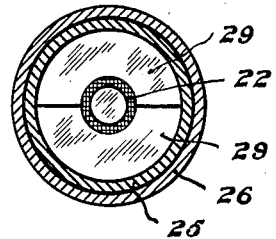

Figure 8 is a cross section through the second modified form.

Figure 9:
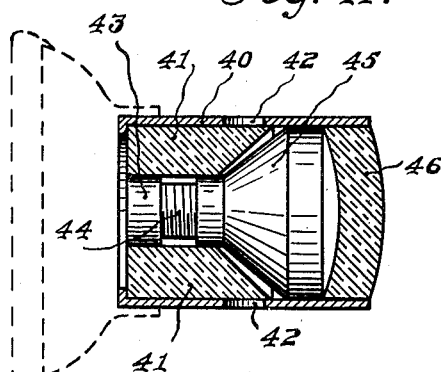

Figure 9 is a longitudinal section of a further modified form of a part of the device, utilizing prisms and external source of light for illuminating the eye in lieu of the self-contained light, such as used in connection with the previously illuminated forms.

Figure 10:
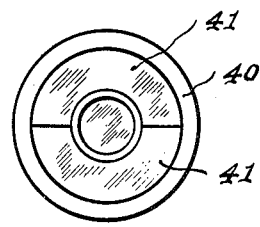

Figure 10 is an end elevation of the structure shown in Figure 9.

Figure 11:
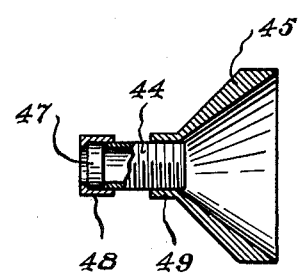

Figure 11 is a section through a modified form of the lens carrier.

Figure 12:
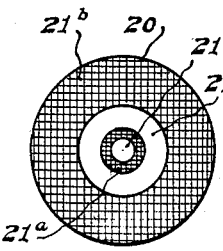
Figure 12:
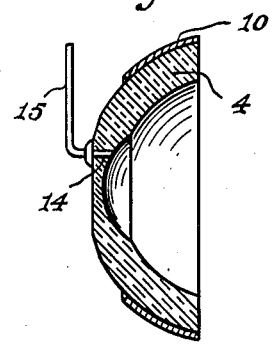

Figure 12 is a section through the contact lens.

Referring more particularly to the drawings, the improved reflectionless ophthalmo illuminator illustrated in Figures 1 to 4 of the drawings, includes the body shell 1 which comprises the cylindrical portion 2 and the flared curved portion 3 in which the concave contact lens 4 is positioned. The concave contact lens 4 has its inner surface ground concavely on two radii so as to properly fit the eye in connection with which the device is being used. The outer surface of the contact lens 4 at its center is flattened, as clearly shown in Figure 2 of the drawings. The contact lens has its convex surface treated to render the major portion of the lens opaque leaving outwardly of the central portion a ring-like transparent portion 6 through which the light rays from the plurality of miniature incandescent light bulbs pass for entrance into the eye and its companion parts. The miniature electric lamp bulbs 7 project through suitable carrying tubes 8 which are formed on the cylindrical portion 2 of the body 1, and their transparent light outlet portions engage directly behind the transparent portion 6 on the contact lens 4, and in lateral juxtaposition to the objective lens, as clearly shown in the drawings. It is to be understood, that the lamp bulbs 7 may be energized by any approved type of source of electric energy. If it is so desired, a cushioning gasket 10 may be positioned within the flared concave portion 2 of the body 1, and serve as a water-tight abutment against which the contact lens engage.

A relative small objective lens 11 is carried by the innermost substantially cylindrical portion of the lens carrier 12, and which abuts the central portion of the contact lens 4, so that the light rays returning from within the eye will pass through the central greater portion of the contact lens through the objective lens and through the correcting lens 13, which abuts the outer end of the lens carrier 12, and from the correcting lens to a suitable sensitized film or plate on which a photographic reproduction of the eye ground may be registered.

The lens carrier 12 has an annular flange 5 formed at its objective lens carrying end which flange forms an opaque screen, at the center of the contact lens, leaving a relatively small centrally located opening in the contact lens through which the photographic light rays pass to the frame on which the photograph of the eye being examined is registered.

The contact lens 4 is provided with a miniature opening 14, with which a duct 15 communicates to permit flooding of the eye engaging surface of the contact lens with any suitable solution, after the device has been placed in position relative to the eye to be treated or photographed, thereby eliminating the inconvenience of moistening the lens or eye prior to the application of the device to the eye.

Figure 1:
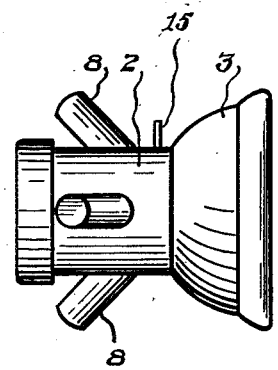
Figure 1 is a side elevation of the preferred form of the reflectionless ophthalmo illuminator.
Figure 2:
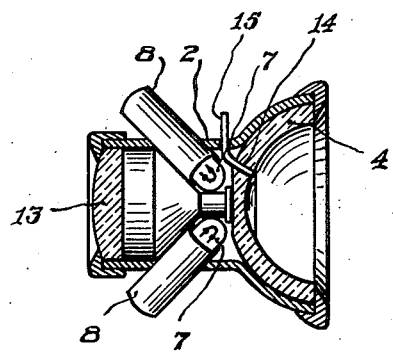
Figure 2 is a longitudinal section through the device showing it positioned relative to an eye when in use.
Figure 3:
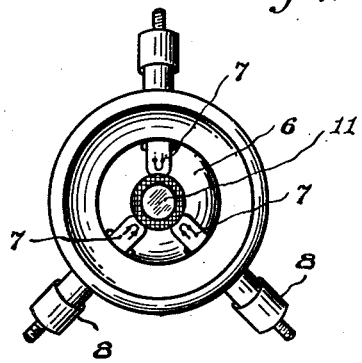
Figure 3 is a front elevation of the improved device.
Figure 4:
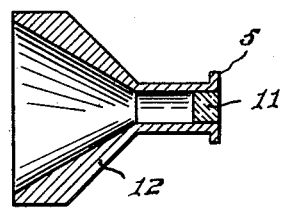
Figure 4 is a detail view of the lens carrying member.
Figure 5:
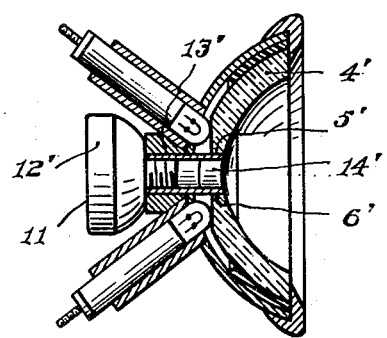
Figure 5 is a detail section showing a slight modification of the device.

If it is so desired, the contact lens 4' may be provided with a central opening 5' as shown in Figure 5 of the drawings, to permit the objective lens to project therethrough and in such construction, the use of the ring-like opaque screen 5 is eliminated, in that the circular opaque screen about the objective lens is formed by the lens surrounding portion of the opaque lens carrier 6'.

Figure 6:
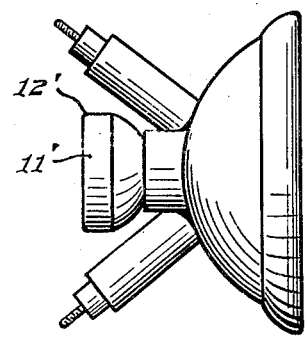
Figure 6 is a side elevation of a modified form of the invention.

In the modified forms shown in Figures 5 and 6 of the drawings, the lens carrier 12' comprises the corrective lens carrier 11' which is threadably connected to the sleeve 13' which sleeve carries the objective lens 14', thereby permitting adjustment of the relative positions of the objective lens 14' and a corrective lens carried by the corrective lens carrier 11'. In all other respects this form is similar to the form previously described.

While in the drawings, three electric light bulbs are shown, it is to be understood that any number of them may be provided, without departing from the spirit of this invention, and it will also be apparent that the blackening of the outer portion of the contact lens will absorb side reflection or refraction.

In the modified form shown in Figures 7 and 8, various forms of reflecting prisms are provided which may be interposed between the eye conforming contact lens 20, which is similar in construction to the contact lens 4 used in the preferred form, and it is preferable that this contact lens have its surface divided into a transparent central area 21, in register with the objective lens, which is carried by the lens carrier 22, a surrounding peripheral trans-illuminating area 21' which is divided from the first transparent area by an intervening annual opaque light and reflex eliminating zone 21$^a$ while it has the major portion 21$^b$ of its outer surface blackened or otherwise rendered opaque to absorb any side reflections or refractions.

If it is so desired, a color filter 22$^a$ may be placed between the correcting lens 22 and the contact lens 20, depending upon the desires of the operator or the need of the individual case being examined.

The lens carrier 23 has a corrective lens 24 carried thereby, the function of which is the same as that of the corrective lens used in the preferred form of the invention.

In the present modified form of the invention, the light bulbs 29 do not enter the cylindrical portion 25 of the casing 26, but the rays therefrom pass through suitable openings 27 in the cylindrical portion entering the prisms 29, which are drilled centrally to receive the objective lens carrier therein, and which have portions of their inner sides beveled as clearly shown in Figure 7 of the drawings, so that the light rays from the light bulbs 29 will pass at right angles through the prism on the radii of the casing, and be reflected at right angles to their initial projection through the prism for transmission through the trans-illuminating area 21' of the contact lens 20, in straight lines for entrance into the eye and for return of reflected rays through the central transparent area 21 of the contact lens, and through the objective and corrective lenses. The reflection of the light rays by the prisms 29 will provide a relatively large trans-illuminating surface. The external casing 22 which includes the cylindrical portion, previously referred to, protects the contact lens and also protects the trans-illuminating and optical lens from soiling by the immersion of fluids or by the eye secretions, and it also excludes any external light and reflects and diffuses the light internally, while the contact lens enclosing portion of the housing and the lens carrier positively exclude external light from entering the optical system.

In Figures 8 and 10, a similar form of the device is illustrated, to that shown in the figures immediately preceding, the difference being that the cylindrical casing 40 which has the prisms 41 therein, is provided with a pair of spaced openings 42 through which natural or an external source of light may penetrate for reflection at right angles by the angular 45° sides of the prisms through a contact lens, as previously described, but is not shown in the present type of illumination. In all other details, this latter modified form is similar to the form utilizing the prisms.

The objective lens carrier 43 is shown adjustably connected by means of a threaded sleeve 44 with the substantially conical body 45 of the lens carrier which directs the rays to the corrective lens 46. In Figure 11 of the drawings, a section of the lens carrier, such as used in the modified form, shown in Figures 9 and 10 is shown, and in this modified form, it will be noted that the objective lens 47 is held in place against the end of the threaded sleeve 44 by a suitable cap 48 and that the sleeve 44 threads into the internally threaded cylindrical portion 49 of the ray deflector 45.

Color filters and light diffusing diaphragms in the form of glass washers, as indicated in Figure 7 of the drawings, may be used in connection with any of the forms of the device previously described, and placed in proximity to the corrective lenses of the various devices, or they may be inserted at any suitable point between the light bulbs or light projecting portions, and the external surface of the eye contacting lens. Color plates, diaphragms, shutters, etc., may be inserted in the lens mounting behind the objective lens or may be used in any suitable supports behind or outwardly of the objective lens.

It is to be understood, that the present forms of reflectionless ophthalmo illuminators, may be used in connection with cameras, of any approved type, for photographing or examining an eye in the interior of the eye or in conjunction with instruments of observation, as microscopes, telescopes, etc., and they may be used in connection with the structure, as disclosed in my application previously referred to, or if it is so desired, they may be used independently of such structure.

It is, of course, to be understood, that the invention may be constructed in various other manners and the parts associated in different relations, and therefore, I do not desire to be limited in any manner, except as set forth in the claims hereunto appended.

What I claim is:

1. In a reflectionless ophthalmo illuminator, an eye contact lens having a concave surface ground on two radii of different lengths to permit proper contact with an eye, an objective lens, and a corrective lens.

2. In a reflectionless ophthalmo illuminator, an eye contact lens having a concave surface ground on two radii of different lengths to permit proper contact with an eye, an objective lens, a corrective lens, and a source of light in proximity to said contact lens.

3. In a reflectionless ophthalmo illuminator, an eye contact lens having a concave surface ground on two radii of different lengths to permit proper contact with an eye, an objective lens, a corrective lens, a source of light in proximity to said contact lens, and an opaque circular screen defining central and outer transparent areas on the contact lens.

4. In a reflectionless ophthalmo illuminator, an eye contact lens, an eye contact lens having a concave surface ground on two radii of different lengths to permit proper contact with an eye, an objective lens, and a corrective lens associated with each other and said contact lens.

5. In a reflectionless ophthalmo illuminator, an eye contact lens, an eye contact lens having a concave surface ground on two radii of different lengths to permit proper contact with an eye, an objective lens, and a corrective lens associated with each other and said contact lens, and means for permitting adjustment of the positions of the objective and corrective lenses.

6. In a reflectionless ophthalmo illuminator, a lens carrier, an eye contact lens carried thereby, an opaque lens carrier, an objective lens carried at one end of said opaque lens carrier, and a corrective lens at the opposite end of the lens carrier.

7. In a reflectionless ophthalmo illuminator, a lens carrier, an eye contact lens carried thereby, an opaque lens carrier, an objective lens carried at one end of said opaque lens carrier, a corrective lens at the opposite end of the lens carrier, and a color filter associated with said lens.

8. In a reflectionless ophthalmo illuminator, an eye contact lens having a concave surface ground on two radii of different lengths to permit proper contact with an eye, and means for lubricating the eye engaging surface of the contact lens.

9. In a reflectionless ophthalmo illuminator, an eye contact lens having a concave surface ground on two radii of different lengths to permit proper contact with an eye, an objective lens, a corrective lens associated with each other and said contact lens, and means for lubricating the eye engaging surface of the contact lens.

10. In a reflectionless ophthalmo illuminator, a lens carrier, an eye contact lens carried thereby, an opaque lens carrier, an objective lens carried at one end of said opaque lens carrier, a corrective lens at the opposite end of the lens carrier, and a source of light in proximity to said lens.

11. In a reflectionless ophthalmo illuminator, a lens carrier, an eye contact lens carried thereby, an opaque lens carrier, an objective lens carried at one end of said opaque lens carrier, a corrective lens at the opposite ends of the lens carrier, a source of light in proximity to said lens, and prisms for directing the light rays from said source of light.

In testimony whereof I affix my signature.

J. FREDERICK HERBERT, Jr., M. D.